United States Patent [19]
Schaaij

[11] Patent Number: 6,056,640
[45] Date of Patent: May 2, 2000

[54] COMPUTERIZED GAMING APPARATUS

[76] Inventor: Johan Michiel Schaaij, Zesstedenenweg 206, 1613 KE Grootebroek, Netherlands

[21] Appl. No.: 09/307,406

[22] Filed: May 7, 1999

Related U.S. Application Data

[63] Continuation of application No. PCT/NL97/00599, Nov. 3, 1997.

[30] Foreign Application Priority Data

Nov. 11, 1996 [NL] Netherlands ............................ 1004491
Nov. 29, 1996 [NL] Netherlands ............................ 1004648

[51] Int. Cl.[7] .................................................. A63B 69/00
[52] U.S. Cl. .................................. 463/4; 463/31
[58] Field of Search .............................. 463/1, 4, 31, 36; 345/329; 434/247

[56] References Cited

U.S. PATENT DOCUMENTS

| | | | |
|---|---|---|---|
| 4,672,541 | 6/1987 | Bromley et al. | 463/31 |
| 4,771,344 | 9/1988 | Fallacaro et al. | 358/335 |
| 5,320,351 | 6/1994 | Suzuki | 463/6 |
| 5,423,554 | 6/1995 | Davis | 463/4 |
| 5,462,275 | 10/1995 | Lowe et al. | 273/94 |
| 5,601,487 | 2/1997 | Oshima et al. | 463/4 |
| 5,782,692 | 7/1998 | Stelovsky | 463/1 |

FOREIGN PATENT DOCUMENTS 0 691 146  10/1996  European Pat. Off. .

OTHER PUBLICATIONS

R. Pausch et al., "Disney's Aladdin: First steps towards storytelling in virtual reality", Computer Graphics Proceedings 1996 (SIGGRAPH), New Orleans, Aug. 4, 1996, Association for Computing Machinery, pp. 193–203.

R. Stoakley et al., "Virtual reality on a WIM: Interactive worlds in miniature ", Human Factors in Computing Systems, CHI '95 Conference Proceedings, Denver, May 7, 1995, Association for Computing Machinery, pp. 265–272.

*Primary Examiner*—Valencia Martin-Wallace
*Assistant Examiner*—John Paradiso
*Attorney, Agent, or Firm*—Heller Ehrman White & McAuliffe

[57] ABSTRACT

A computer game system is adapted for a number of human players to play a computer game in which at least one game object is manipulated in a game area by a number of virtual game characters. The game is played on at least one computer or a number of interlinked computers for controlling the game system. The computer game system also has player input units for a human player to control one of the virtual game characters, and a number of player output units for presenting to the human players sensory information in a part of the game area in which a virtual game character is situated. Visual display means display the entire game area, the game characters and each game object.

17 Claims, 3 Drawing Sheets

COMPUTERIZED GAMING APPARATUS

CROSS-REFERENCE TO RELATED APPLICATIONS

This is a continuation application of PCT/NL 97/00599 filed on Nov. 3, 1997.

FIELD OF THE INVENTION

This invention relates to a computer game system for a number of human players to play a computer game in which at least one game object is manipulated in a game area by a number of virtual game characters.

BACKGROUND OF THE INVENTION

Computer game systems where several human players play a game with each other are generally known. In such systems use is often made of computers which are set up at great geographical distance from each other and which are linked by means of data communication lines to each other, and possibly to a central computer system. Each participant makes his contribution to the game by way of his own computer and therefore has no human contact with the other players, in view of the geographical spread of the computers. For non-participants in the game, the game is uninteresting, because of the lack of an overall view of the game and the players and their behaviour.

SUMMARY OF THE INVENTION

The object of the invention is to provide a computer game system which is ideal for being played in one area, and is also interesting for non-participants in the game. The invention therefore aims to make the computer game much more of a group event than an individual event.

To that end, the computer game system according to the invention is characterized in that it comprises: at least one computer or a number of interlinked computers for controlling the game system; a number of player input units linked to said at least one computer, each player input unit for at least one of the human players to control at least a part of one of the virtual game characters; a number of player output units linked to said at least one computer, each for presenting to one of the human players sensory information in a part of the game area in which one of the virtual game characters is situated; and visual display means for displaying the entire game area, the game characters and each game object.

In the computer game system according to the invention at least one human player, by way of a player input unit operated by said player, controls a virtual game character or game figure, such as a human being, an animal, a plant, a robot or the like, or a part thereof, for example the movement of a body and/or a part of the body within a game area which will usually be three-dimensional, but can also be substantially two-dimensional, such as a playing field. The player input unit possibly comprises a computer, and is linked to the computer game system by wireless means or by a cable which transmits electrical signals or optical signals. The human player receives information on the current game situation by way of a player output unit which presents sensory information such as pictures, sounds, tactile information, smells or the like to the human player. Each human player perceives only a part of the game area by way of the player output unit, namely the part in which the virtual game character controlled by the human player is situated. The visual display means incorporated in the computer game system according to the invention—which display means can consist of a flat or curved display screen (substantially two-dimensional), but can also be formed by projection means which produce a three-dimensional display—give both the participants and the non-participants the opportunity to follow the events in the entire game area, which makes the computer game also interesting in particular for non-participants. The visual display means can be linked to a video recording system of a television studio, for example if the computer game being played is to be broadcast as a television programme. This makes the computer game entertaining for a very large group of television viewers.

In a preferred embodiment, the player input units each comprise a keyboard for controlling the virtual game characters or a part thereof. In another preferred embodiment, the player input units each comprise a joystick for this purpose. A combination of a keyboard and a joystick is also possible. A player input unit can also comprise at least one sensor which is worn on a part of the body of the human player and records the movement thereof, in order to control the movement of the corresponding virtual game character.

The player output units preferably each comprise a visual display unit, such as a monitor or glasses with display screens worn on the head of a human player, possibly also having a sound reproduction unit with one or more loudspeakers, for example in the form of a headphone. Such player output units can form part of a helmet in which a visual display unit for each eye or one for both eyes is accommodated.

In a special embodiment, each player input unit comprises a camera for recording the face of the human player or players belonging to the player input unit, provision being made for means for displaying the pictures taken by the camera by way of said visual display means. Displaying the facial expression of the participants in the game on the visual display means, such as a large display screen, in particular is very entertaining for the viewing non-participants in the game. The pictures of the facial expressions of the human players are preferably displayed on the display screen outside the game area, for example in the form of pictures placed next to each other along the edge of the display screen.

In a preferred embodiment of the computer game system according to the invention, the game played is a competition between two or more teams of game characters, such as soccer, American football, hockey, cricket, baseball, basketball, volleyball, korfball, hurling, tennis doubles, badminton doubles, table tennis doubles etc. It is possible for the teams to be in the same physical area, but this is not essential: different teams can be in different geographical places.

This means that, for example, not only can two or more teams at one location play against each other, but each individually can also play against one or more teams at other locations, by linking the computer configuration situated at the first location by way of a network to one or more computer configurations situated at the other locations. If in this case visual display means in the form of a number of display screens are placed at the first-mentioned location, said number corresponding to the number of teams at said location, the progress of the game between each of the teams at said location and the teams in competition with them at other locations can then be followed by non-participants in the game. Of course, instead of a number of pictures on different display screens, it is also possible to use a single picture on a single display screen on which views of the various games being played are shown in a sequence to be determined by a producer.

If different teams are at different locations, essentially all that is necessary is an exchange of position data relating to the game characters and the game object(s) between the respective computer configurations, with the result that hardly any time delay occurs and only a low load is placed on the network linking the computer configurations.

The claims and advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
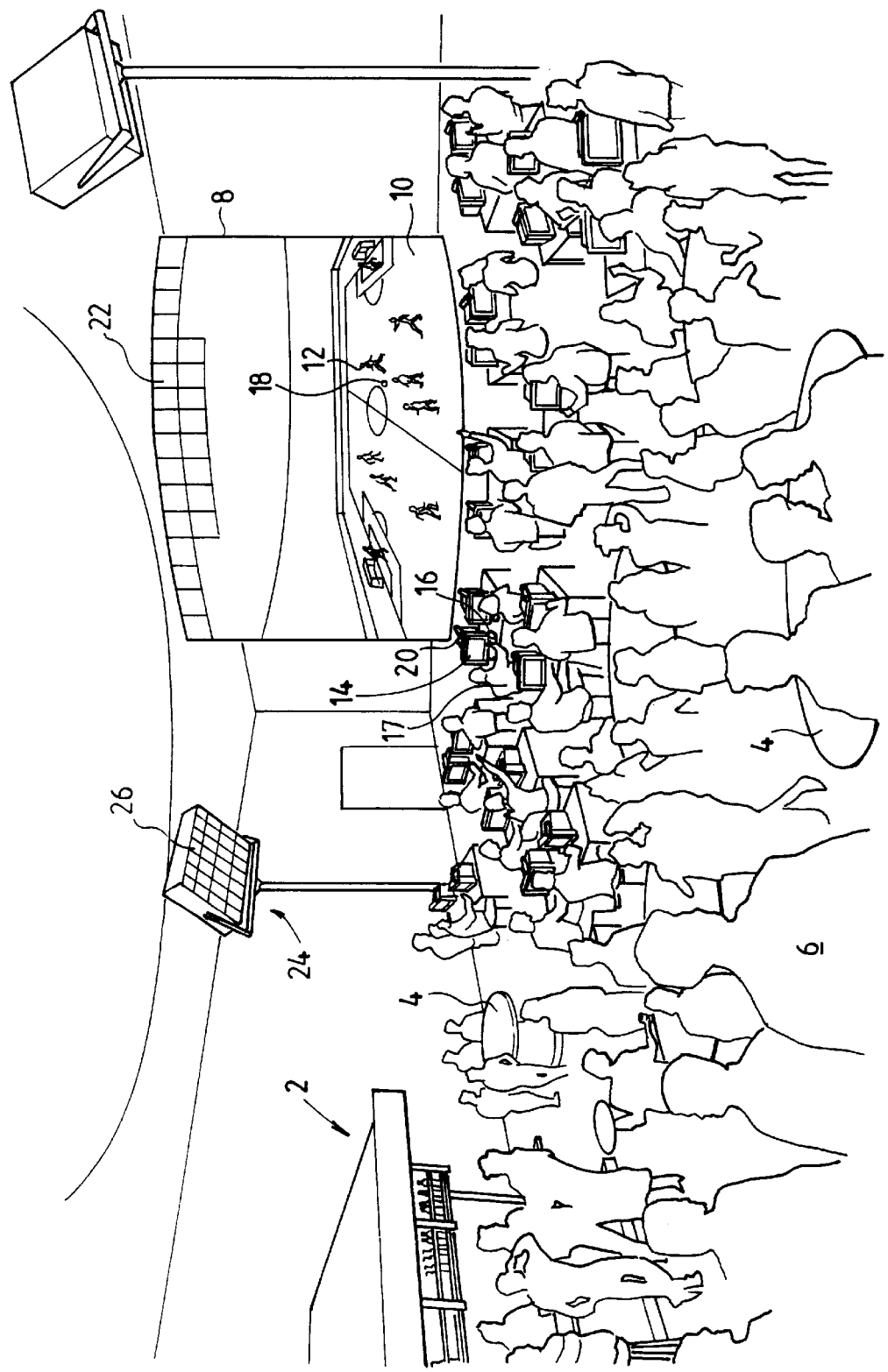
FIG. 1 shows in perspective an overall view of a system in use.

According to FIG. 1, a screen 8, on which an overall view of the game area 10 of a computer game is presented by means of one or more computers, is set up in a area, for example a catering establishment with a bar 2 and tables 4 at which visitors 6 to the area can consume food and/or drinks. All persons present in the room or some of them can see the game area 10 on the screen. A number of virtual players 12 in the game area 10 are shown on the screen 8.

A number of display screens 14 are also set up in the area, which display screens are linked by way of a corresponding computer, or directly, to the computer displaying the game area 10 on the screen 8. Each display screen 14, on which only part of the game area 10 shown on the screen 8 is visible, has a player input unit 16, such as a keyboard or a joystick. The player 17 seated in front of the display screen 14 can control the movements of a virtual player 12 in the game area 10 by means of the player input unit 16, in which case the part of the game area 10 on which the virtual player 12 belonging to the display screen 14 concerned is moving is shown on that display screen 14. In the case illustrated, the game object being manipulated by the virtual players 12 is a ball 18, and the game is a game of soccer.

Figure 2:
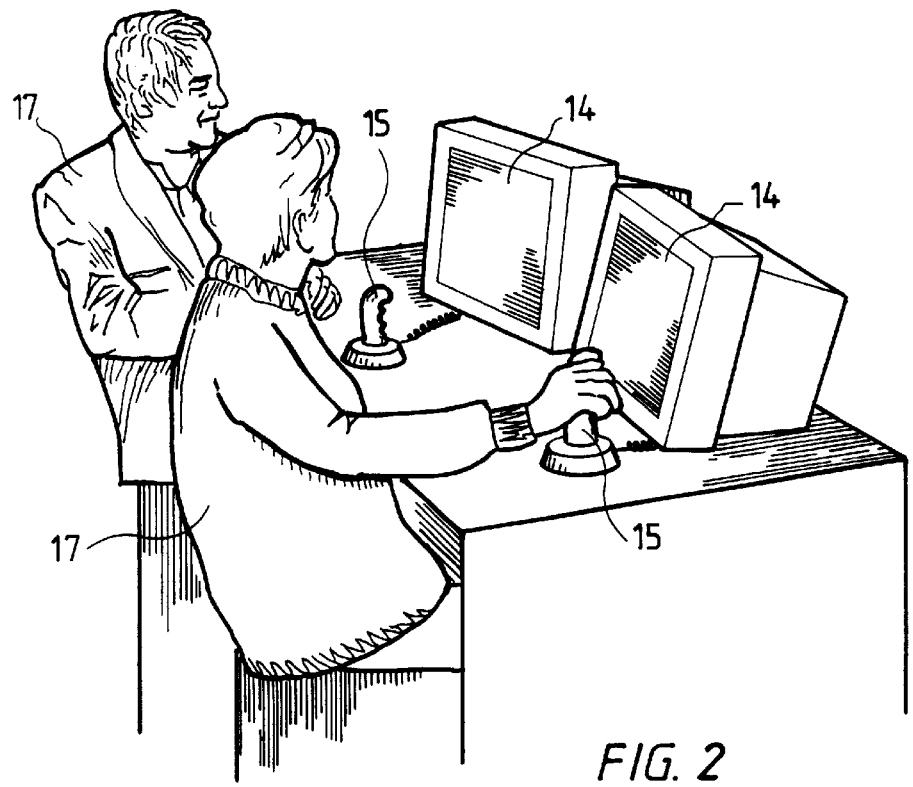
FIG. 2 shows in perspective an embodiment of a player input unit and a player output unit.

FIG. 2 shows a player input unit in the form of a joystick 15 belonging to a display screen 14.

Figure 3:
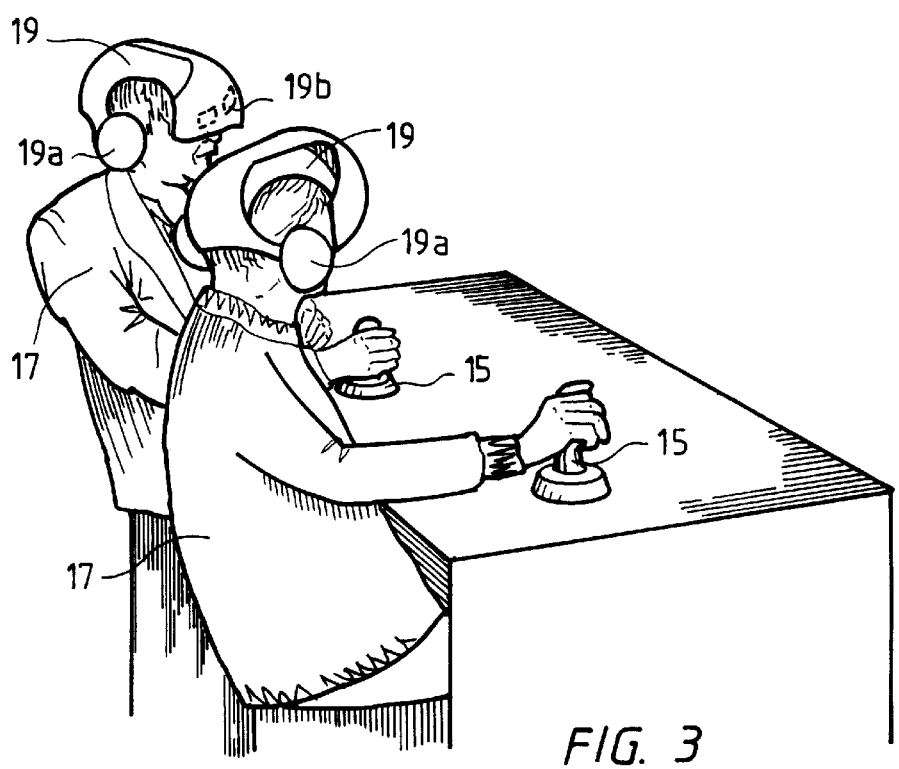
FIG. 3 shows in perspective a further embodiment of a player input unit and a player output unit.

In FIG. 3 the players 17 are wearing a helmet 19 in which a headphone 19a and display screens 19b are integrated.

Figure 4:
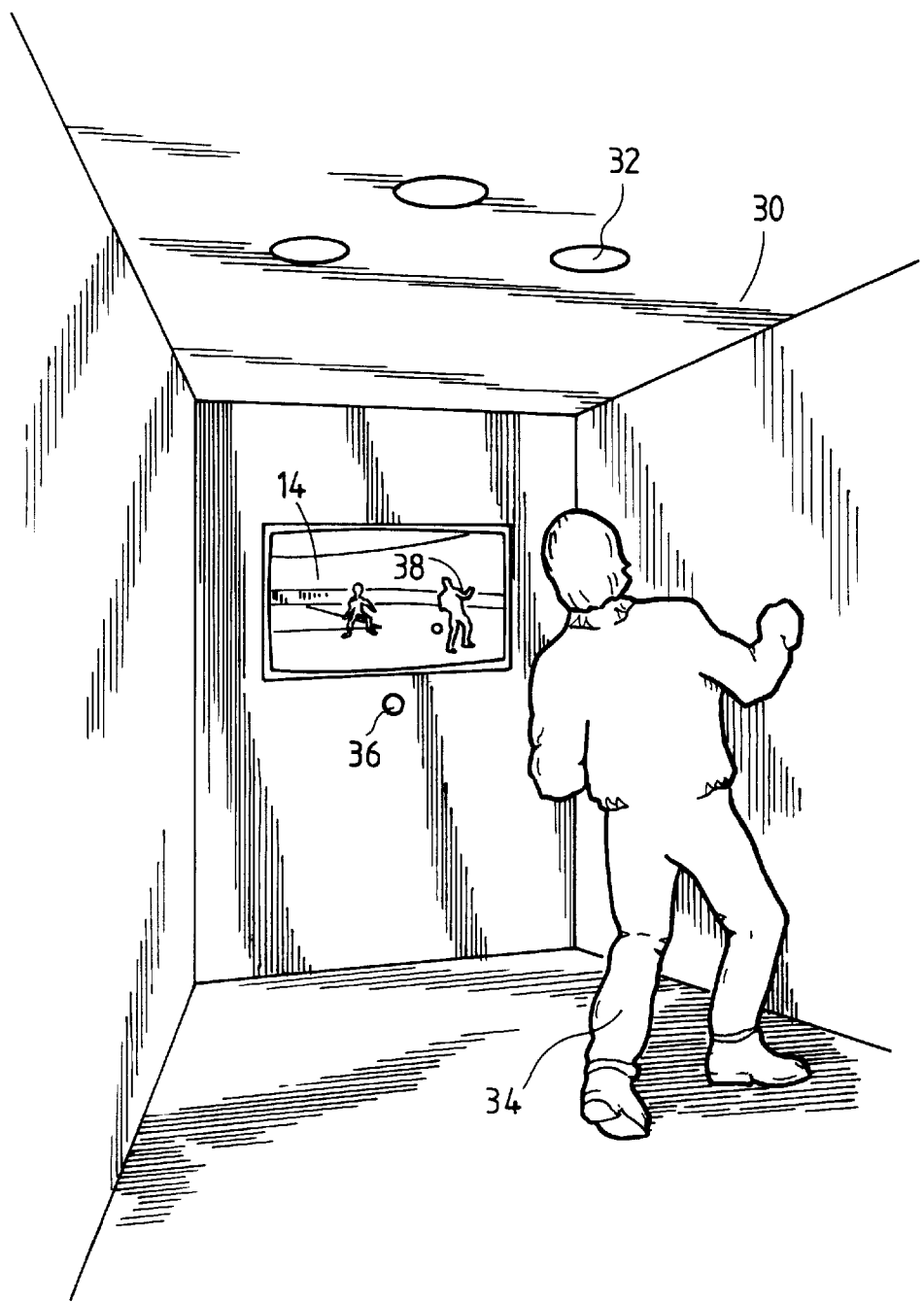
FIG. 4 shows in perspective another embodiment of a player input unit and a player output unit.

FIG. 4 shows a human player 34 in a room 30 with suitable lighting 32, the position of the player's body being recorded by a camera 36 and converted by the computer game system linked thereto into a substantially identical position of a game character 38 shown on a display screen 14. The player in this case, as it were, puts himself completely in the shoes of the virtual game character, but without being subject to the risk of injuries from the actions of fellow players.

According to FIG. 1, a camera 20 is fitted on each display screen 14, which camera provides a view of the facial expression of the player 17 sitting in front of the display screen 14. The view of the facial expression of each of the players 17 is projected into a part 22 of the screen 8, so that both the visitors 6 and the players 17 can see the different facial expressions, in order to increase the atmosphere of the game.

In the region where the players 17 are, lighting towers 24 are set up, and lights 26 which can be switched on selectively can illuminate one or more of the players, for example when the virtual player 12 belonging to the human player 17 concerned is in possession of the ball 18.

While the invention has been described and illustrated in its preferred embodiments, it should be understood that departures may be made therefrom within the scope of the invention, which is not limited to the details disclosed herein.

What is claimed is:

1. A computer game system for a number of human players to play a computer game in which at least one game object is manipulated in a game area by a number of virtual game characters, comprising:

at least one computer or a number of interlinked computers for controlling the game system;

a number of player input units linked to said at least one computer, each player input unit for at least one of the human players to control at least a part of one of the virtual game characters;

a number of player output units linked to said at least one computer, each for presenting to one of the human players sensory information relating to the part of the game area in which one of the virtual game characters is situated; and visual display means for displaying the entire game area, the game characters and each game object.

2. The computer game system of claim 1, wherein the player input unit comprises a keyboard.

3. The computer game system of claim 1, wherein the player input unit comprises a joystick.

4. The computer game system of claim 1, wherein the player input unit comprises at least one sensor which is worn on a part of the body of the human player and records the movement thereof.

5. The computer game system of claim 1, wherein that the player input unit comprises a camera which records the position of the human player's body.

6. The computer game system of claim 1, wherein the player output unit comprises a visual display unit.

7. The computer game system of claim 6, wherein the visual display unit consists of a monitor.

8. The computer game system of claim 6, wherein the visual display unit comprises at least one display screen to be worn on the head of the human player.

9. The computer game system of claim 1, wherein the player output unit comprises a sound reproduction unit.

10. The computer game system of claim 9, wherein the sound reproduction unit consists of a headphone.

11. The computer game system of claim 6, wherein the player output unit forms part of a helmet.

12. The computer game system of claim 1, wherein the player input unit comprises a camera for recording the face of the human player(s) belonging to the player input unit, and wherein provision is also made for means for displaying the pictures taken by the camera by way of said visual display means.

13. The computer game system of claim 12, wherein the pictures taken by the camera are displayed outside the game area.

14. The computer game system of claim 1, wherein the visual display means are linked to a video recording system of a television studio.

15. The computer game system of claim 1, wherein provision is made for lighting means for illuminating one or more of the human players.

16. The computer game system of claim 15, wherein the system is adapted to illuminate the human player controlling the virtual game character who is in possession of the game object.

17. The computer game system of claim 1, wherein the game played with the computer game system is a team competition game, such as soccer, American football, hockey, cricket, baseball, basketball, volleyball, korfball, hurling, tennis doubles, badminton doubles, table tennis doubles etc.

* * * * *